THIN FILM MAGNETIC MEMORY WITH PARAMETRON DRIVER CIRCUITS

INVENTORS
WILLIAM J. BARTIK
WOO FOUNG CHOW
EDWARD N. SCHWARTZ
BY Fred Fisher
ATTORNEY Jan. 7, 1969 W. J. BARTIK ET AL 3,421,153

THIN FILM MAGNETIC MEMORY WITH PARAMETRON DRIVER CIRCUITS

Filed July 28, 1964

United States Patent Office 3,421,153

Patented Jan. 7, 1969

3,421,153

THIN FILM MAGNETIC MEMORY WITH PARAMETRON DRIVER CIRCUITS

William J. Bartik, Jenkintown, Woo Foung Chow, Horsham, and Edward N. Schwartz, Philadelphia, Pa., assignors to Sperry Rand Corporation, New York, N.Y., a corporation of Delaware Filed July 28, 1964, Ser. No. 385,569

U.S. Cl. 340—174 7 Claims

Int. Cl. G11b *5/00;* H01f *27/42*

ABSTRACT OF THE DISCLOSURE

A magnetic memory system is provided which has a plurality of plated wires arranged in rows and a plurality of orthogonally positioned conductive straps which surround the plated wires. A first plurality of parametrons each coupled to a respective conductive strap is used to selectively excite the plated wires and a second plurality of parametrons each coupled to a respective plated wire is used to receive signals from the plated wires or to deliver switching signals thereto.

This invention relates to a magnetic memory in combination with a single frequency alternating current writing and reading means, and, in particular, to a thin magnetic film plated wire memory in combination with parametron means for writing into and reading from the memory.

Magnetic memories are useful as storage devices for electronic data processing equipment. Such memories include a plurality of storage elements wherein each storage element is capable of assuming two different states: one state representing a one, the other state representing a zero. Each storage element therefore represents a binary digit or bit of information. Various types of storage elements have been used including vacuum tubes, transistors, magnetic cores, thin magnetic planar films, and other devices. More recently, magnetic arrays have been suggested which utilize thin magnetic film plated wire as storage elements wherein different alternating current frequency sources are provided for writing, reading, and for communicating with the storage element. The provision of different frequencies for communicating with the storage elements requires relatively complex and expensive circuitry.

Parametric circuits of the prior art generally included pairs of non-linear reactors, such as cores having a plurality of coils wound thereon, together with fixed capacitors, damping resistors and coupling resistors. Parametric circuits have been provided which are constructed using solely two components; namely, plated wire and resistance wire, by Bartik et al. in U.S. patent application 322,818, filed Nov. 12, 1963, and assigned to the common assignee of this application. Resonator circuits utilizing the basic "parametron" circuits have been described including a shift register and a majority gate circuit, both of which are useful in electronic data processing machines. Such circuits have been described by Eiichi Goto, U.S. Patent No. 2,948,818, issued August 9, 1960.

Therefore, it is an object of this invention to provide novel parametron circuits including a memory.

Another object of this invention is to provide a novel magnetic memory utilizing a single frequency for writing into and reading from the memory.

Yet another object of this invention is to provide a novel memory including a common input/output parametron wherein the memory is adapted to store the representation of the phase of a sine wave written into the parametron, and the memory is adapted to provide a representation of the phase of a sine wave to the parametron when reading from the memory.

Still another object of this invention is to provide a novel magnetic memory which has non-destructive readout characteristics, is simple to construct, and is economical to operate.

Still another object of this invention is to provide a novel magnetic memory wherein write signals, read signals, and excitation signals are all of the same frequency.

Yet another object of this invention is to provide a novel magnetic memory which is especially suitable for use with the parametron type circuitry.

In accordance with one embodiment of this invention, a thin magnetic film plated wire memory is provided with each of the plated wires representing a different binary positional order or bit of words. Individual conductive straps enclose each of the plated wires forming a matrix of bit plated wires with word straps substantially perpendicular thereto. Individual reference parametrons and word select parametrons are coupled to each of the word straps, respectively. Each of the reference parametrons is set to oscillate at a fixed frequency having a reference phase 0. Each of the word select parametrons is adapted to oscillate at the same fixed frequency and at either the same phase 0 or at a phase $\pi$. The word select parametron for the selected word strap is set to oscillate at the phase 0; all the remaining word select parametrons, corresponding to the non-selected word straps, are adapted to oscillate at the phase $\pi$. Alternating current at the fixed frequency and at the phase 0, selectively superimposed upon a direct current bias by way of suitable coupling means (whereby the resulting current maintains the same polarity as the bias), is applied to the selected word strap, one strap at a time, for reading out of, or for writing into the memory. The remaining word straps carry a direct current bias with an absence of alternating curent.

When reading out of the memory, by applying the fixed frequency at the phase 0 to the desired word strap, the plated wires are sensed and the phase of the output current is detected by way of bit/sense parametrons via a phase shift network. Whether the sensed signal is in phase or $\pi$ radians out of phase with the reference state 0 is indicative of a 0 or a 1, respectively, stored therein.

A 0 or a 1 is written into the desired bit location of a word by intially actuating the corresponding bit/sense parametron to oscillate at the fixed frequency at a phase which is in phase or $\pi$ radians out of phase with the reference source, and by subsequently actuating the word select parametrons so that the selected word strap contains alternating current at the fixed frequency which is superimposed upon the D.C. bias. The phase of the signal applied to the bit/sense parametron is shifted by the phase shifting network. The magnetic state of the thin film element enclosed by the word strap is switched to the 0 or 1 condition, respectively.

Other objects and advantages of this invention, together with its construction and mode of operation, will become more apparent from the following description, when read in conjunction with the accompanying drawing, in which like reference symbols refer to like components or conditions, and in which.

Figure 1:
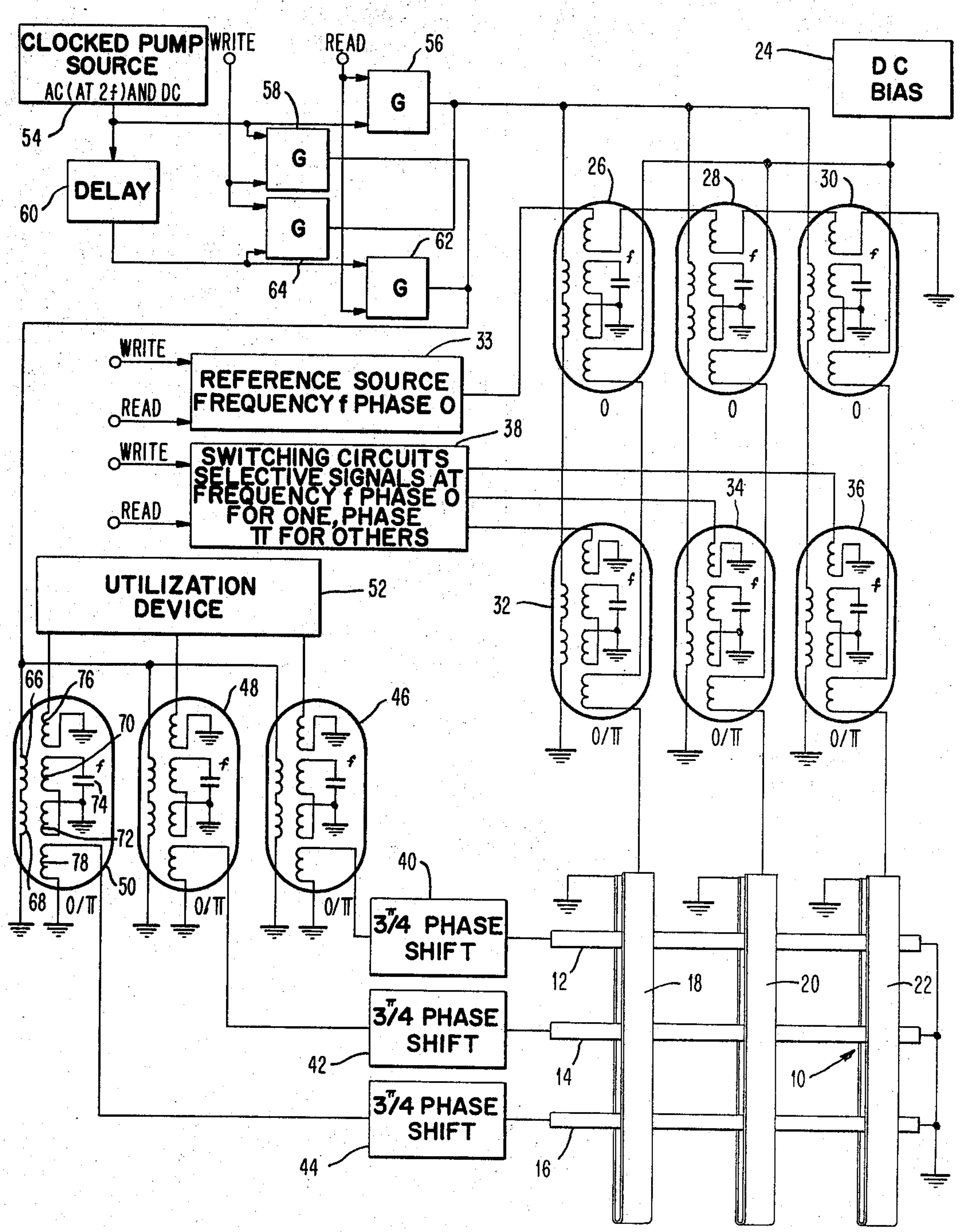
FIG. 1 is a schematic diagram of one embodiment of this invention.

Referring to FIG. 1, there is shown a schematic diagram of one embodiment of this invention illustrating a magnetic memory matrix 10, including a plurality of plated wires 12, 14, 16, each of the wires being plated with a thin film of magnetic alloy. These bit wires 12, 14, 16 of the matrix 10 represent the different individual binary positional orders of three-bit words. Additional bit wires, not illustrated, can be added for words having more bits. A plurality of individual word straps 18, 20, 22 each enclose the wires 12, 14, 16. One end of each of the word straps 18, 20, 22 is coupled to a point of reference potential, such as ground. The other end of each of the word straps 18, 20, 22 is coupled to a current source or D.C. bias 24. Reference phase parametrons 26, 28, 30 are individually suitably coupled to the word straps 18, 20, 22, as example, by inductive means. Each of the reference parametrons 26, 28, 30 is adapted to oscillate at a fixed frequency $f$ having a reference phase 0 by means of a reference source 33 which is inductively coupled to the parametrons 26, 28, 30. Word select parametrons 32, 34, 36 are also suitably coupled to each of the individual word straps 18, 20, 22, as example, by inductive coupling. Only one of the word select parametrons 32, 34, 36, at a time, is adapted to oscillate at the fixed frequency having the reference phase 0. The remaining word select parametrons are adapted to oscillate at the fixer frequency $f$ having a phase $\pi$ with respect to the reference source 33. Each of the word select parametrons 32, 34, 36 is coupled to a switching circuit 38 which provides selective signals at the fixed frequency $f$ and at phase 0 and phase $\pi$ for locking the phase of oscillation of the parametrons 32, 34, 36.

Each of the plated wires 12, 14, 16 is suitably terminated at one end to a point of reference potential, such as ground. The remaining ends of the plated wires 12, 14, 16 are coupled through $3\pi/4$ phase shift networks 40, 42, 44, respectively, to individual bit/sense parametrons 46, 48, 50.

The bit/sense parametrons 46, 48, 50 are coupled by suitable means to a utilization device 52, which device 52 acts as a terminal for input and output signals for writing into and reading from the memory.

A clocked pump source 54 provides alternating current at a frequency $2f$ superimposed upon a D.C. bias directly through a "read" gate 56 to the pump windings of the reference and word select parametrons 26, 28, 30, 32, 34, 36. The pump source 54 is directly coupled through a "write gate" 58 to the pump windings of the bit/sense parametrons 46, 48, 50. In addition, the source 54 is delayed by a suitable delay means 60, and is applied through a second "read" gate 62 to the pump windings of the bit/sense parametron 46, 48, 50. The pump signal from the output of the delay means 60 is also applied through another "write" gate 64 to the pump windings of the reference and word select parametrons 26, 28, 30, 32, 34, 36. The "read" gates 56 and 62 are activated during a read operation; the "write" gates 58, 64 are activated during a write operation.

The reference, word select, and bit/sense parametrons 26, 28, 30, 32, 34, 36, 46, 48, 50 are similar, and each may include components as illustrated within the circled parametron 50. The parametron 50 includes a pair of serially connected pump windings 66, 68. Output tank windings 70, 72, inductively coupled to the pump windings 66, 68 are connected in series opposition, and are coupled in a closed loop with a tuning capacitor 74, the circuits 70, 72, 74, being tuned to the frequency $f$ (one-half the frequency of the pump source 54). The output circuit of the parametron 50 includes a pair of output windings 76, 78. One of the windings 76, 78 is utilized for providing a locking-in signal for the parametron 50. An output signal from the parametron 50 is obtained from the other windings 78, 76.

Figure 2:
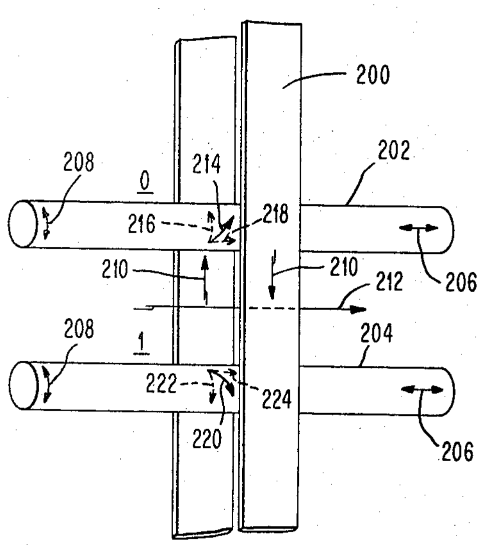
FIG. 2 is a diagram illustrating the conditions existing at the intersections of plated wire and a word strap shown in FIG. 1.

FIG. 2 illustrates how the memory 10 stores binary information. For purposes of illustration, FIG. 2 illustrates a word strap 200 which is placed orthogonal to and encloses two plated bit wires 202, 204. The bit wire 202 at the vicinity of the word strap 200 is arbitrarily selected to carry a bit representation of a 0. The bit wire 204 at the vicinity of the word strap 200 is arbitrarily selected to carry a bit representation of a 1. The wires 202 and 204, which may be of a 0.005-inch-diameter beryllium-copper, are plated with a thin (for example, 10,000 angstroms) anisotropic magnetic film having a circumferentially preferred magnetization vector. Thus, the hard axis of magnetization 206 is axial with respect to the wires 202, 204; the easy axis of magnetization 208 is circumferential with respect to the wires 202, 204. The word strap 200 carries an alternating current superimposed upon a D.C. bias, whereby the polarity of the current is maintained and varies along one direction 210. The curernt in the direction 210 through the word strap 200 produces a field 212 parallel to the direction of the hard axis 206.

The remanent state of magnetization at a bit position in the vicinity of the word strap 200 can lie in either direction along the easy axis 208, either in a clockwise manner or a counter-clockwise manner (as illustrated in FIGURE 2, either in a downward direction or an upward direction). When direct current from the bias 24 is applied, in the absence of alternating current on the word strap 200, the magnetization vector for a 0 in the plated wire 202 lies in a skewed or helical direction 214 in the upward right-hand direction, as shown in FIG. 2. As alternating current is applied, the vector 214 rotates to and fro between limits 216, 218, the limit 216 approaching the easy axis 208, and the limit 218 approaching the hard axis 206. In a similar manner, as direct current from the bias 24 is applied in the absence of alternating current on the word strap 200, the magnetization vector 220 for a 1 assumes the position (illustrated in FIG. 2) in the downward right-hand direction. The magnetization vector 220 rotates to and fro between the limits 222, 223, the limit 222 approaching the easy axis 208 and the limit 224 approaching the hard axis 206.

In operation, assume a quiescent condition with information stored in the memory 10. The parametrons 26, 28, 30, 32, 34, 36, 46, 48, 50 are off, and D.C. bias 24 may or may not be applied.

When it is desired to read a word from the memory 10, which word is defined by the magnetic states of the bit wires 12, 14, 16 at the juxtaposition of one of the word straps 18, 20, 22 such as the word strap 18, the reference source 33 applies a locking signal at the fixed frequency $f$ having the reference phase 0 to the reference parametrons 26, 28, 30. The switching circuit 38 applies a locking signal at the fixed frequency $f$ at the phase 0 to the selected word select parametron 32, and a locking signal at the fixed frequency $f$ at the phase $\pi$ to the non-selected word select parametrons 34, 36. Subsequent to the application of the locking signals provided by the reference source 33 and the switching circuit 38, the pump source 54 applies alternating current at the frequency $2f$, superimposed upon the D.C. bias, through the read gate 56 to the pump windings of the parametrons 26, 28, 30, 32, 34, 36, whereby the reference parametrons 26, 28, 30 oscillate at the fixed frequency $f$ at the phase 0 and the word select parametrons 32, 34, 36 oscillate at the fixed frequency $f$, the selected word select parametron 32 oscillating at the reference phase 0 and the non-selected word select parametrons 34, 36 oscillating at the phase $\pi$. The outputs of the reference parametron 26 and the word select parametron 32 are individually inductively coupled to the word strap 18. Similarly, the reference parametron 28 and the word select parametron 34, and the reference parametron 30 and the word select parametron 36, are inductively coupled to the word straps 20 and 22, respectively. The output signal at the fixed frequency $f$ at the reference phase 0 from the reference parametron 28, and the output signal at the fixed frequency $f$ at a reference phase $\pi$ from the non-selected word select parametron 34, when inductively coupled to the word strap 20, are of such magnitude that they, in effect, cancel each other. Similarly, the 0 phase output from the reference parametron 30 and the $\pi$ phase output from the non-selected word select parametron 36 are of such magnitude that they, in effect, cancel each other on the word strap 22.

Figure 3:
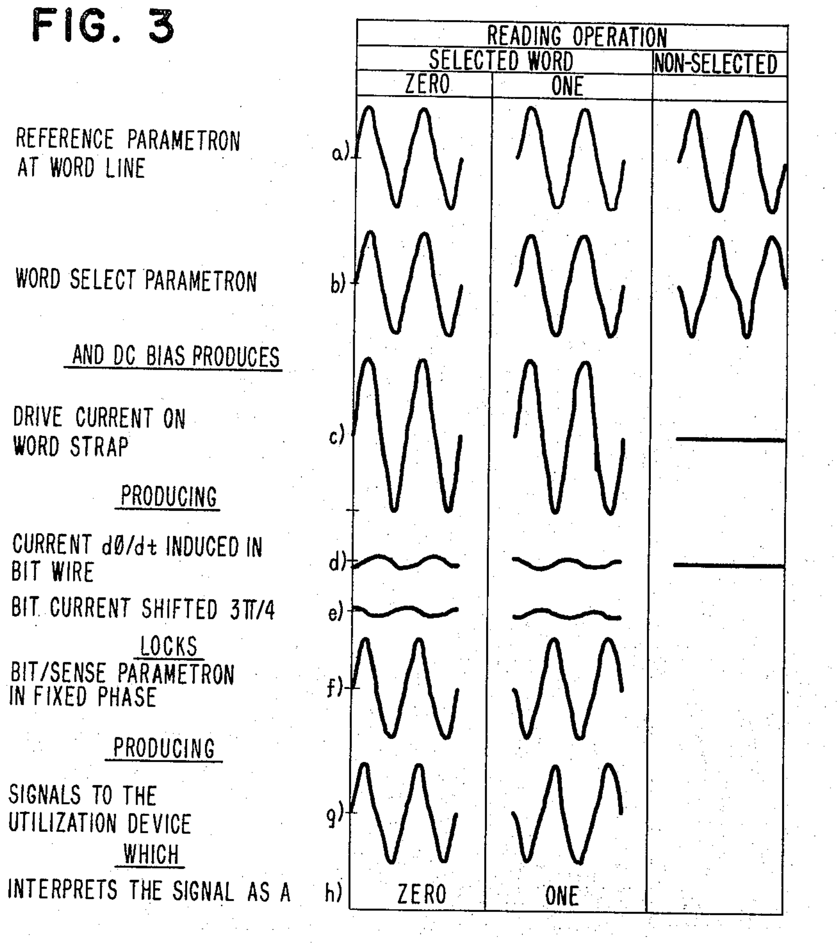
FIG. 3 is a set of waveforms which illustrates the conditions during a reading operation.

However, the 0 phase output from the reference parametron 26 and the 0 phase output from the selected word select parametron 32 re-inforce each other onto the word strap 18. Thus, as shown by the wave forms (*a*) of FIG. 3, the reference parametrons 26, 28, 30 each provides a fixed frequency signal at the 0 phase for both the selected word line and the non-selected word lines. The word select parametron for a selected word line is in phase with the reference parametron; the word select parametron for the non-selected line is $\pi$ radians out of phase, as shown by the waveforms (*b*) of FIG. 3. Thus, alternating current on the selected word line is in phase with the reference parametron, as shown by the waveforms (*c*) of FIG. 3, the alternating drive current on the word line being superimposed upon the D.C. bias. The drive current on a non-selected word line includes, solely, the D.C. bias, there being an absence of any alternating current thereon. The direct current carried on a non-selected word line induces no current onto the bit line. The alternating current on the selected word strap causes the magnetic vector for a 0 and 1 on the bit lines, at the juxtaposition of the word strap, to rotate to and fro between the limits which cause a change in flux per unit of time to be produced, whereby current is induced into the bit line. The waveform of the current induced, when a 1 is stored, leads the current on the word line by $\pi/2$ radians; the current induced on the bit line, when a 0 is stored, lags the regerence source by $\pi/2$ radians (as shown by waveform (*d*) of FIG. 3). The currents produced on the bit lines are shifted $3\pi/4$ radians by the phase shift circuits 40, 42, 44 (waveforms (*e*) of FIG. 3) whereby the output of the phase shift circuits provides locking signals which leads the reference source by $\pi/4$ radians for a 0, and lags the reference source by $3\pi/4$ radians for a 1. The bit/sense parametrons 46, 48, 50 are adapted to oscillate in only one of two different phases, 0 or $\pi$, with respect to the reference, depending upon the phase of the locking signal applied thereto. When a bit/sense parametron 46, 48, 50 has a sufficient locking signal which leads its 0 phase state by $\pi/4$ radians (thereby providing a component at 0 phase), that locking signal is sufficient to excite the parametron to oscillate in phase with the reference source (waveform (*f*) of FIG. 3). Hence, the in-phase condition is interpreted (waveforms (*g*)) by the utilization device 52 as the binary representation zero (waveforms (*h*)). When the locking signal applied to the bit/sense parametron lags the reference source by $3\pi/4$ radians thereby leading the $\pi$ phase state by $\pi/4$ radians and providing a component at $\pi$ radians, this locking signal causes the bit/sense parametron to lock in at the phase $\pi$ with respect to the reference source, whereby the $\pi$ radians out-of-phase condition is interpreted by the utilization source 52 as the binary One.

The manner in which information is stored on the wire is illustrated in FIG. 2. Information is stored according to the direction of the circumferential magnetization in the magnetic element portion of the plated wire enveloped by the word strap 200. A remanent clockwise magnetization vector represents a stored binary 1; a remanent counter-clockwise magnetization vector represents a stored binary 0. Word current 210, applied to the word strap 200 which envelops the plated wires 202, 204 at right angles to the central axis of the wires, produces a magnetic word field 212 along the hard axis 206 of the wires 202, 204. The average or D.C. component of the word field 212 tilts the magnetization vector from its circumferential rest position to a skewed or helical position 214, 220; the alternating component of the word field 212 causes the vector 214, 220 to rotate to and fro between the limits 216, 218 and 222, 224, respectively. The resulting flux and current changes at the end of the plated wires 202, 204 are such that one signal occurs for a stored 1 and the opposite signal occurs for a stored 0. The word current amplitude is controlled so that, upon its termination, the magnetization vector 214, 220 returns to its original circumferential rest position; thus the read-out is non-destructive.

Information is written into the wire 202, 204 through the word strap 200 and a "steering" bit current which flows through the plated wire 202, 204 as described in greater detail hereinafter. When the bit current flows in a certain phase, the magnetization vector is so steered that, upon release of the bit and word current, the vector assumes the binary 1 rest position, regardless of the previous condition. When the bit current flows in a different certain phase, the vector assumes the binary 0 position, regardless of the previous state of the film.

Figure 4:
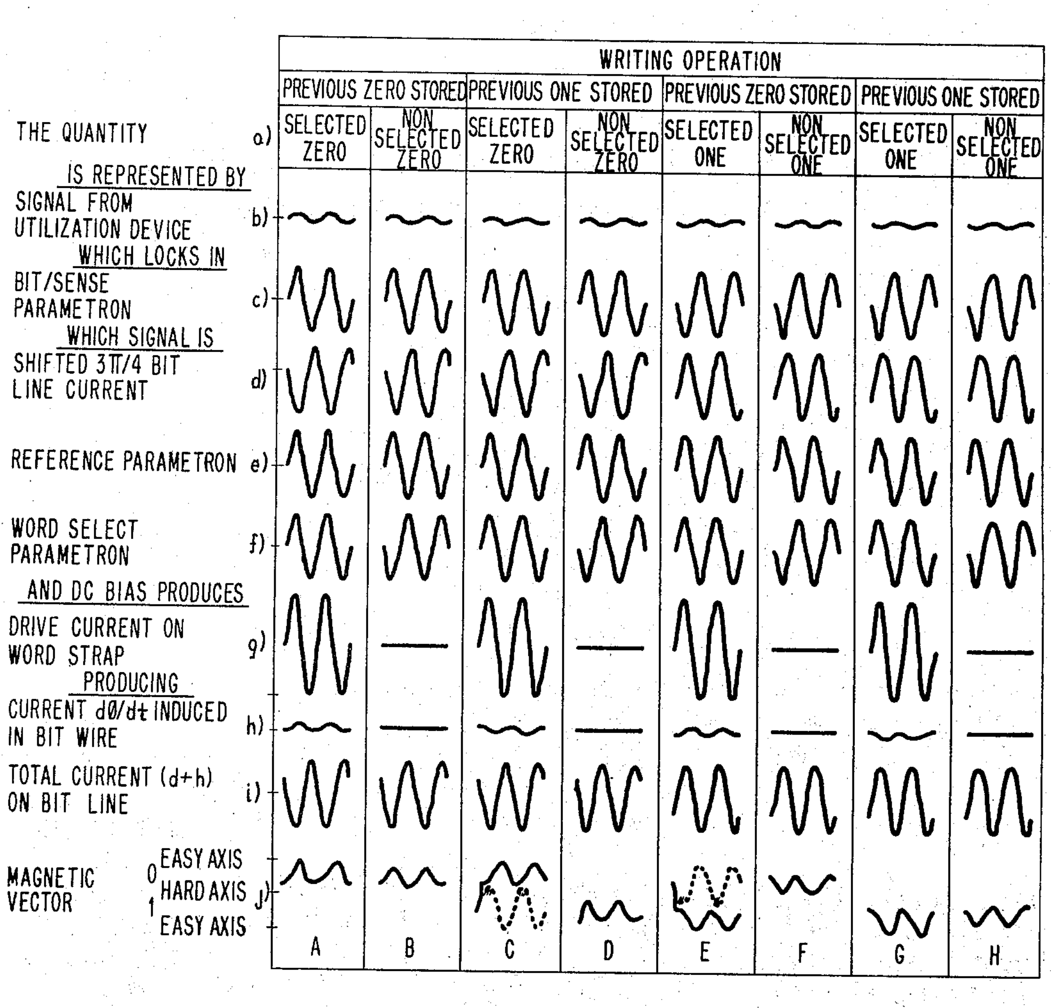
FIG. 4 is a set of waveforms illustrating the conditions during a writing operation.

Referring now to FIG. 4, there are illustrated waveforms which are useful for understanding a writing operation. Immediately prior to a writing operation, all the parametrons 26, 28, 30, 32, 34, 36, 46, 48, 50 are non-oscillating. Locking signals of the proper phase are then applied from the utilization device 52 (waveforms (*a*) and (*b*)) to the bit/sense parametrons 46, 48, 50. The signal from the utilization device 52 when in phase (i.e., 0 phase) with the reference source represents a binary 0. When $\pi$ radians out of phase (i.e. $\pi$ phase) with the reference source, the signal represents a binary 1. Immediately following the application of the locking signals from the utilization device 52 to the bit/sense parametrons 46, 48, 50, the clocked pump source 54 provides the pump signal, by way of the write gate 58, to the corresponding pump windings 66, 68 of the bit/sense parametrons 46, 48, 50, whereby the bit/sense parametrons 46, 48, 50 oscillate in the desired corresponding phase. The signals from the utilization device are small in amplitude and each acts to lock in its corresponding parametron 46, 48, 50, which parametron provides an amplified output at the same phase (waveform (*c*) of FIG. 4). The output of the parametrons 46, 48, 50 are coupled to the $3\pi/4$ phase shift networks 40, 42, 44, respectively, which networks act to shift the phases of the currents applied thereto by the respective parametrons 46, 48, 50 onto the corresponding plated wires 12, 14, 16. The current, due to the bit/sense parametrons 46, 48, 50, produced in the bit lines 12, 14, 16 is illustrated by the waveform (*d*) of FIG. 4. Following the excitation of the bit/sense parametrons 46, 48, 50, the pump source signal, which is delayed by means of the delay circuit 60, is coupled through the write gate 64 to the pump windings of the reference parametrons 26, 28, 30 and the word select parametrons 32, 34, 36 whereby the reference parametrons 26, 28, 30 (see waveform (*e*) of FIG. 4) oscillate at the fixed frequency *f* at the reference phase 0, and the selected one of the word select parametrons 32, 34, 36 oscillates at the reference phase 0; the remaining word select parametrons oscillate at the reference phase $\pi$ (see waveform (*f*) of FIG. 4). The drive current present on the word line 18, when that word line 18 is selected, is an alternating current at the fixed frequency *f* having the reference phase 0 superimposed upon a D.C. bias whereby the drive current remains at one polarity; the remaining word lines 20, 22 contain solely the direct current bias, being absent any alternating current thereon (as illustrated by the waveform (*g*) of FIG. 4). Alternating current on the word line 18 tends to produce a negligible current onto the bit wires 12, 14, 16, due to the rate of change of magnetic flux of the magnetic element. Such negligible current is illustrated by waveform (*h*) of FIG. 4. The individual current (waveform (*h*) of FIG. 4) induced in the plated bit wires 12, 14, 16 by the alternating field produced by the word line, together with the individual current (waveform (*d*) of FIG. 4) induced in the plated bit wires 12, 14, 16 caused by the bit/sense parametrons 46, 48, 50, are added and tend to form the waveform ($i$) illustrated in FIG. 4. However, since the current of waveform ($h$) of FIG. 4 is small compared to the current of waveform ($d$) of FIG. 4, waveform ($i$) is substantially the same as waveform ($d$). Due to the simultaneous application of an alternating circumferential field (due to the alternating bit current of waveform 4$i$) and the alternating axial field (due to the drive current produced on the word line), the magnetic vector for the element tends to vary to and fro as illustrated by waveform ($j$) of FIG. 4. When a 0 or a 1 has been stored in a film element, the application of a signal instructing the new writing of a 0 or a 1, respectively, merely cause the magnetization vector for that particular state to vary to and fro within its respective quadrant. However, where a previous 0 had been stored and it is desired to write a 1, or where a previous 1 had been stored and it is desired to write a 0, the magnetization vector is shifted from the old state to the new state.

Referring to FIG. 4$j$, there is illustrated the loci of the direction of the field as applied to the magnetic state of the film for various conditions: by applying the sinusoidal word strap current together with the delayed line current for a "zero," when a "zero" had previously been stored, a variable field is created which causes the magnetic vector to rotate to and fro within the easy quadrant (FIG. 4$j$–A); upon removal of the quadrature fields, the magnetic vector for the film returns to its original remanent state.

When it is desired to write a 0 where previously a 1 had been stored, the resultant field causes the magnetic vector to traverse along the dotted path from the "1" quadrant into the "0" quadrant whereby the vector is required to cross the hard axis, following the solid line path illustrated in FIG. 4$j$–C. By crossing the hard axis, the magnetic vector reverts to its 0 easy axis condition and hence, during continued application of the quadrature fields, would rotate to and fro within the 0 quadrant.

In a similar manner, writing a 1 where a 0 previously was stored causes the magnetic vector to traverse the dotted-line path of FIG. 4$j$–E from the 0 quadrant including the hard axis, whereby the magnetic vector is switched to the 1 quadrant and continues to traverse the solid line path within the 1 quadrant.

Where a previous 1 was stored, the magnetic vector remains in the 1 quadrant, rotating to and fro within that quadrant, as shown in FIG. 5$j$–G.

As illustrated in the FIGS. 4$j$–B, D, F, H, the magnetic vector for the magnetic element enclosed by a non-selected word line, when the quadrature fields are applied, rotates to and fro within its original quadrant; upon removal of the quadrature fields, the magnetic vector returns to its original easy axis position.

The in-phase condition of both the axial and circumferential fields is sufficient to provide proper switching most of the time. However, by changing the relative phases of the two fields, as described above, switching is more effective as illustrated by the shaded area 518, 520. During that time when the magnetic vector of the film tends to be aligned along shaded area, effective switching takes place.

A plated wire memory constructed in accordance with this invention possesses various favorable characteristics. First, the read operation is non-destructive for a large range of current in the word line. In addition, the same amplitude of word current is applied in the same direction onto the word strap as for both a write operation and a read operation, the write operation including the coincidence application of a bit current to the bit wires. The plated bit wire need not be cleared of old information stored thereon prior to a writing operation. In its rest condition, the magnetic path of a bit element is closed; consequently, the information stored is not significantly affected by external magnetic fields. Other advantages include the fact that signals of ±10 millivolts can be handled with ease in a memory system, and a wide tolerance design in a sense amplifier can be accommodated. Also, the energy required to switch the plated wire is about 1/200 of that required to switch a 50-mil-OD, 30-mil-ID ferrite core; consequently, the power requirements for a plated wire memory are low. As an additional advantage, the bit/sense wire is the copper wire upon which magnetic material is plated; only one additional conductor, a word strap, is required. Angular accuracy of the word strap can be ±10° from its nominal 90° with respect to the plated wire without significantly affecting memory operation; this large angular tolerance facilitates inexpensive construction. Also, extraneous signals are minimized because of this orthogonality. There is no mutual inductance coupling between the lines and only a small capacitive coupling. Therefore, the wire can be prepared and tested simply and economically. Another advantage is that up to 25 bits per inch can be packed along the axis of the plated wire. The center-to-center spacing of the wires can be as close as the circuitry which gains access to the memory will allow; 30 wires to the inch is feasible. Because the resulting density is 750 bits per square inch, a memory of small volume can be constructed.

Although there is illustrated, in the drawings, a memory of three words of three bits each, it is understood that the principles taught herein apply to larger size memories. Such a large size memory may include "word-groups" straps in lieu of "word" straps wherein each "word-group' straps represent a plurality of words.

Other modifications will suggest themselves to those skilled in the art without departing from the spirit and scope of this invention. What has been described and shown has been an embodiment of this invention which applicant currently contemplates constitutes the best mode of carrying out this invention. Therefore, it is the intention that this invention be constructed broadly, and that it be limited solely by the scope of the claims.

The embodiments of the invention in which an exclusive property or privilege is claimed are defined as follows:

1. In combination, (a) a thin magnetic film matrix including a first plurality of rows of individual thin anisotropic magnetic film elements, each said element having an easy remanent axis of magnetization and a hard axis perpendicular thereto;

(b) a like plurality of wires, one for each of said rows, each of said wire being coupled so that its axis is parallel to the hard axes of magnetization of its respective row of said film elements;

(c) a second plurality of wires, each coupled to said first plurality of rows of magnetic film elements, said second plurality of wires being coupled having their axes perpendicular to said first plurality of wires;

(d) a first single frequency parametron means coupled to said first plurality of wires; and (e) second single frequency parametron means coupled to said second plurality of wires, said first and second single frequency parametron means being adapted to oscillate at the same frequency; wherein said first and second frequency means are adapted to store information into and read information out from, said magnetic film elements.

2. The combination as claimed in claim 1 wherein one row of said first plurality of rows of elements and one wire of said like plurality of wires consists of a wire plated with a magnetic coating wherein its easy remanent axis of magnetization is circumferential to said wire, and said hard axis is axial to said wire.

3. In combination, (a) a thin film storage matrix including a first plurality of plated wires, said wires each being plated with a thin anisotropic coating of magnetic material, said magnetic material having an easy axis of magnetization circumferential with respect to the axis of said wires;

(b) a plurality of word straps each enclosing said plated wires;

(c) a plurality of bit/sense parametrons being respectively coupled to said plated wires and adapted to oscillate at a fixed frequency; and (d) a plurality of word select parametrons being respectively coupled to said word straps, said parametrons being adapted to oscillate at the same said fixed frequency.

4. In combination, (a) a thin magnetic film plated wire memory including a first plurality of plated magnetic wires having an easy axis of magnetization circumferential with respect to said wires;

(b) a plurality of conductive word straps each enclosing all of said plated wires, thereby forming a matrix of bit plated wires with word straps substantially perpendicular thereto;

(c) a plurality of reference parametrons;

(d) a plurality of word select parametrons, said reference parametrons and said word select parametrons being coupled to the corresponding word straps, each of said reference parametrons being adapted to oscillate at a fixed frequency having a reference phase 0, each of said word select parametrons being adapted to oscillate at said fixed frequency and selectively either said phase 0 or at phase $\pi$ with respect to said reference phase;

(e) means for selecting one of said word select parametrons to oscillate at said phase 0, and the remaining word select parametrons to oscillate at said phase $\pi$;

(f) means for providing a direct current bias onto said word straps; and (g) a first plurality of bit/sense parametrons, said parametrons being coupled to their respective plated wires; all of said parametrons being adapted to oscillate at same fixed frequency.

5. In combination, (a) a first, a second, and a third plated bit wire coated with a thin magnetic anisotropic film having its easy axis of magnetization circumferential with respect to said wire;

(b) a first, a second, and a third bit/sense parametron each adapted to oscillate at a fixed frequency;

(c) a first coupling means adapted to couple said first bit/sense parametron to said first plated wire;

(d) a second coupling means adapted to couple said second bit/sense parametron to said second plated wire;

(e) a third coupling means adapted to couple said third bit/sense parametron to said third plated wire;

(f) a first, a second, and a third word strap, each adapted to enclose said first, second, and third plated wires;

(g) a direct current source;

(h) means for coupling each of said first, second, and third word straps to said direct current source;

(i) a first, a second, and a third reference parametron each adapted to oscillate at said fixed frequency;

(j) a first, a second, and a third word select parametron, each adapted to oscillate at said fixed frequency;

(k) means for coupling the output of said first reference parametron and the output of said first word select parametron to said first word strap;

(l) means for coupling the output of said second reference parametron and the output of said second word select parametron to said second word strap;

(m) means for coupling the output of said third reference parametron and the output of said third word select parametron to said third word strap;

(n) a utilization device having three terminals coupled thereto;

(o) means for coupling one of said terminals to said first bit/sense parametron;

(p) means for coupling a second of said terminals to said second bit/sense parametron;

(q) means for coupling the third of said terminals to said third bit/sense parametron;

(r) a clocked pump source being adapted to provide signals at double said fixed frequency together with a direct current bias;

(s) means for coupling said pump source to the pump windings of all of said parametrons;

(t) means for providing said pump source to be applied initially to said reference parametrons and word select parametrons and then to said bit/sense parametrons during a reading operation, and for providing said pump source to said bit/sense parametrons and then to said reference parametrons and said word select parametrons during a writing operation;

(u) means for causing said reference parametron to oscillate at a fixed reference phase 0; and (v) means for selectively causing one of said word select parametrons to oscillate at said phase 0 and the remaining word select parametrons to oscillate at said phase $\pi$, one word strap at a time carrying said fixed frequency at said reference phase 0, and the remaining word straps carrying an absence of alternating current thereon, whereby all of the parametrons oscillate at the same fixed frequency.

6. The invention as claimed in claim 5 wherein said first, second, and third coupling means are adapted to shift the phase of oscillation applied thereto.

7. A memory for storing the binary significance temporarily stored in a parametron comprising:

(a) a bit/sense parametron adapted to receive a pump source for excitation thereof and adapted to receive a locking signal and to provide an output signal, said parametron being tuned to oscillate at a fixed frequency $f$;

(b) a utilization device for providing a locking signal to the said parametron when "writing" and for receiving an output signal from said parametron when "reading";

(c) a plated magnetic wire having an easy axis of anisotropy circumferential with respect to said wire;

(d) a first network coupling said plated wire to said parametron;

(e) a word strap coupled about said plated wire substantially perpendicular thereto;

(f) a direct current source coupled to said word strap; and (g) single frequency alternating current means being adapted to be coupled to said word strap, said single frequency means providing alternating current at said fixed frequency; whereby a signal temporarily transferred from said utilization device to said bit/sense parametron is stored in said plated wire, by initially exciting said parametron, and subsequently in coincidence therewith coupling said current means to said strap; and whereby said plated wire is to read out its stored signal to said parametron for transfer to said utilization device upon initially coupling said frequency means to said word strap, and subsequently in coincidence therewith exciting said parametron.

References Cited

UNITED STATES PATENTS 3,175,200 3/1965 Hoffman ---------- 340—174

TERRELL W. FEARS, *Primary Examiner.*

U.S. Cl. X.R.

307—88